United States Patent [19]

Crawford

[11] Patent Number: 4,803,832
[45] Date of Patent: Feb. 14, 1989

[54] METHOD AND APPARATUS FOR FORMING BALES

[75] Inventor: Alexander Crawford, Mississauga, Canada

[73] Assignee: Massey-Ferguson Inc., Detroit, Mich.

[21] Appl. No.: 276,448

[22] Filed: Jun. 22, 1981

[51] Int. Cl.$^4$ ............................................. A01D 39/00
[52] U.S. Cl. ......................................... 56/341; 100/8; 100/80
[58] Field of Search .................. 56/14.1, 28, 131, 141, 56/341, 343, 432, 98, 185; 100/8, 76, 80, 40; 19/160, 163; 198/725, 643

[56] References Cited

U.S. PATENT DOCUMENTS

| | | | |
|---|---|---|---|
| 879,639 | 2/1908 | Hayes | 100/80 |
| 1,135,146 | 4/1915 | Strickland | 56/185 |
| 1,496,363 | 6/1924 | Bonna Foux | 56/341 |
| 1,496,364 | 6/1924 | Bonna Foux | 56/341 |
| 2,731,782 | 1/1956 | Mason | 56/341 |
| 4,086,749 | 5/1978 | Greiner | 56/98 |
| 4,175,487 | 11/1979 | Molitorisz | 100/80 |
| 4,270,446 | 6/1981 | Molitorisz | 100/8 |
| 4,273,034 | 6/1981 | Molitorisz | 100/8 |

FOREIGN PATENT DOCUMENTS

| | | |
|---|---|---|
| 116580 | 4/1930 | Austria . |
| 2042415 | 9/1980 | United Kingdom ................. 56/341 |
| 0024371 | 3/1981 | European Pat. Off. . |
| 2457395 | 6/1976 | Fed. Rep. of Germany . |
| 315956 | 5/1935 | Italy . |
| 575954 | 12/1961 | Italy . |

Primary Examiner—John Weiss
Attorney, Agent, or Firm—John C. Thompson

[57] ABSTRACT

Method and apparatus for forming bales. The baler (10) which performs the method includes a bale chamber (16) having a forward inlet end. Mounted forwardly of the bale chamber are conveying means (26) which may include a crop pickup (76). Feeding means (28) are disposed between the conveying means and the inlet end of the bale chamber, the feeding means simultaneously engaging opposed surfaces of a rearwardly conveyed mat of crop material while alternately feeding opposed surfaces of the mat in a rearward direction to a location adjacent the inlet end of the bale chamber. Moving means (46) are provided to move the fed mat of crop material back and forth across the inlet end of the bale chamber to form successive layers of folded crop material within the bale chamber. The feeding means includes a pair of parallel rollers (32) on which saw tooth like feed elements (40) are supported, the elements being so arranged that they more aggressively feed the mat when moved in a direction towards the inlet end of the bale chamber (16) than when moved away from the inlet end. The rollers are carried by common supports (48), and the moving means, which may be hydraulic cylinders (50), move the common supports and the rollers back and forth across the inlet end of the bale chamber.

58 Claims, 4 Drawing Sheets

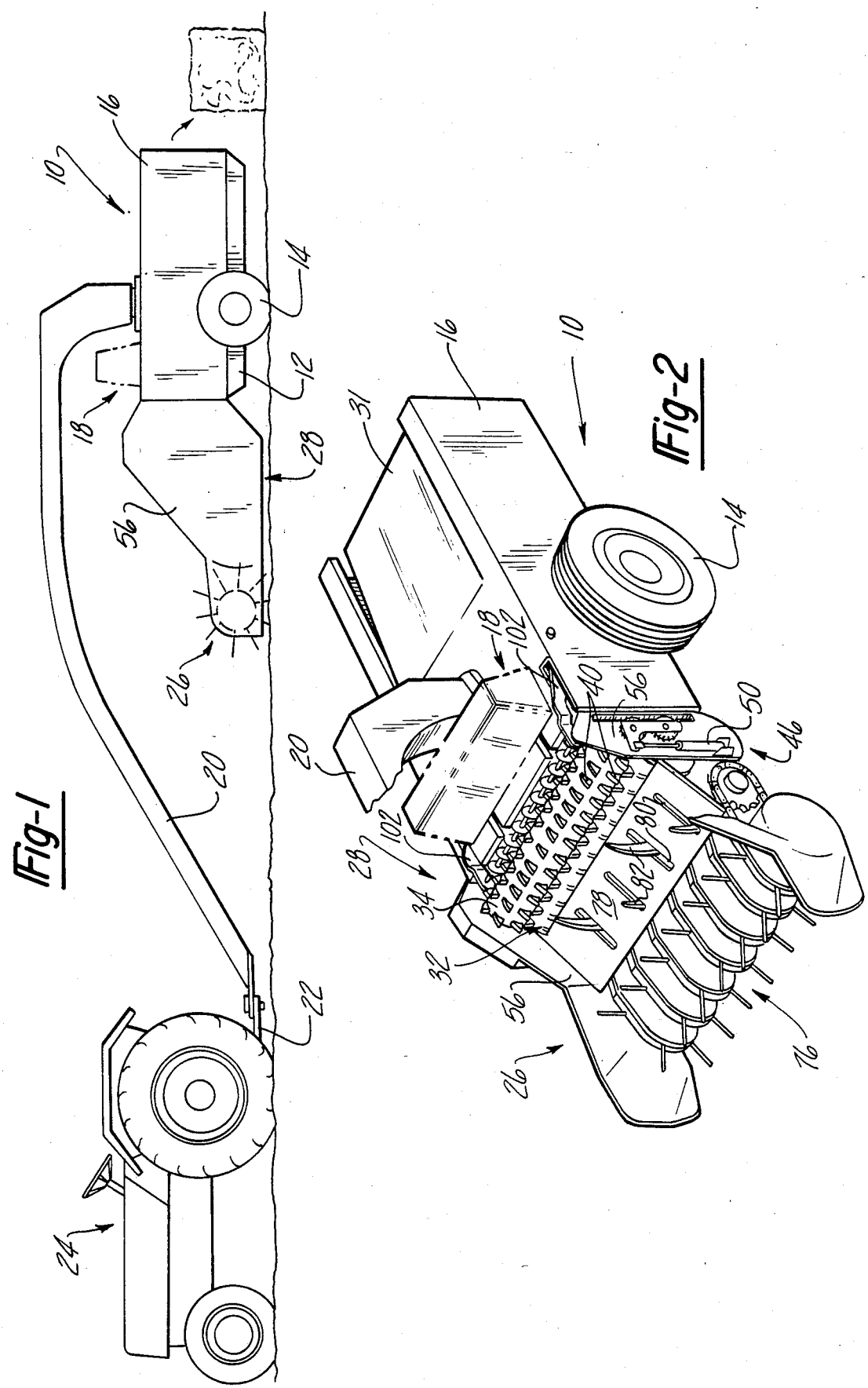

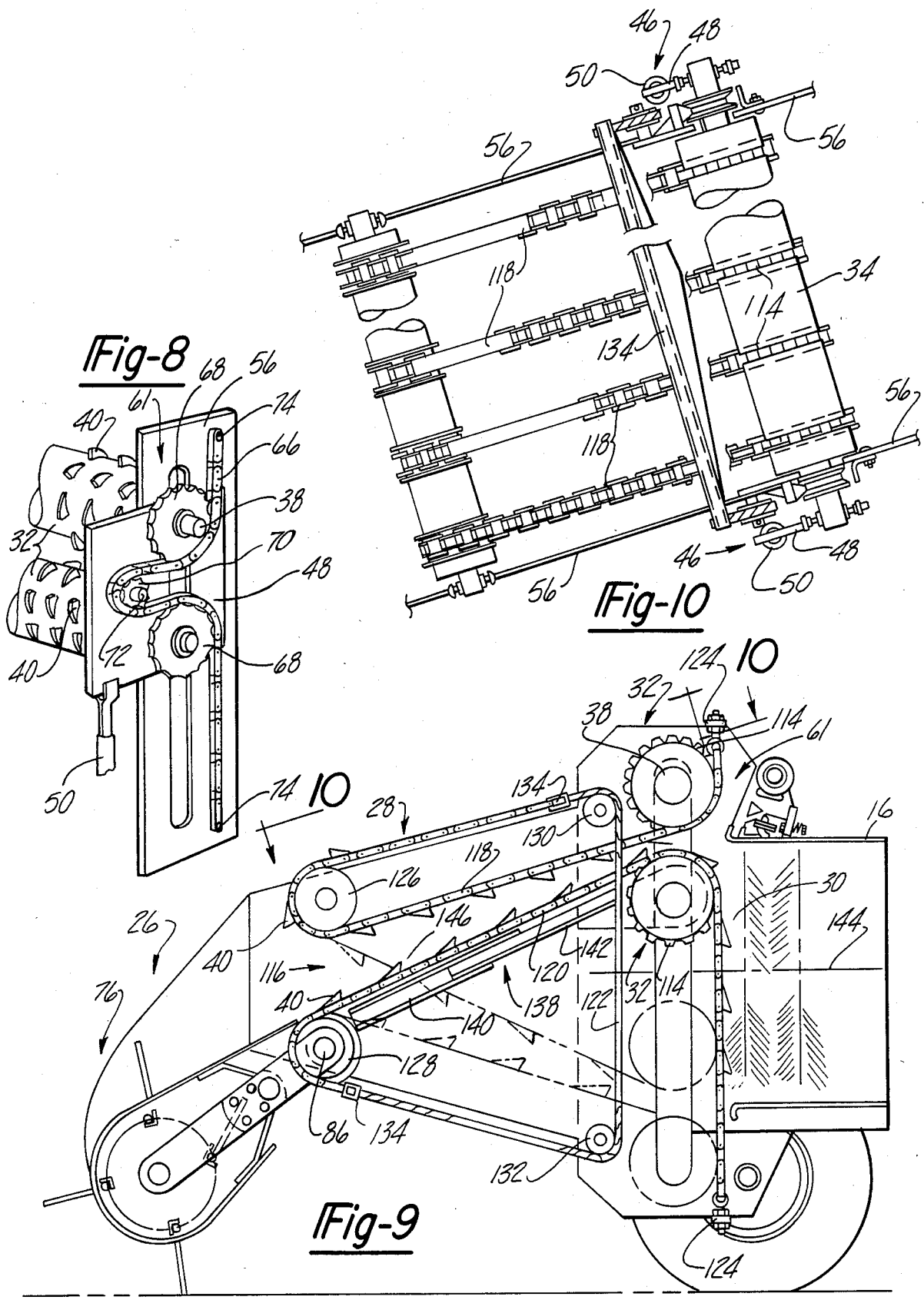

METHOD AND APPARATUS FOR FORMING BALES

FIELD OF THE INVENTION

The present invention relates generally to a method and apparatus for forming fibrous material into bales, and more particularly to a crop baler of the type adapted to be propelled forwardly across a field, and the method practiced by such a baler.

BACKGROUND OF THE INVENTION

Many forms of balers are well known today. The most commonly used field baler of today forms a rectangular bale by picking up crop material by means of a crop pickup, transferring the crop material laterally by means of packer fingers to the forward end of the bale chamber, and then compressing the crop material into a bale by means of a plunger which conventionally operates in the range of 50 to 100 strokes per minute. The bales are then tied off into lengths which generally vary from 3 to 4 feet in length. Most of these bales have a 14 or 16 inch by 18 inch cross section and can be manually handled after baling. Larger bales (16×23 inch) are more suitable for machine handling. During the last 40 years large numbers of automatic balers of this type have been produced and hay baled by machines of this type are of good quality and are suitable for long term storage.

During the past 20 years efforts have been made to develop other bale packages which are more suitable for machine handling. One form of baler, pioneered by Vermeer and others, and typically illustrated in U.S. Pat. No. 3,722,197 produces a large round bale of approximately 4 to 5 feet in width and having a similar diameter. Such round bales have good field storage characteristics, but are difficult to handle and are also difficult to stack in enclosed areas. In addition, the baler must be stopped when discharging a bale, and care must be taken when working on a hillside to ensure that the bale does not start rolling down the hill.

An alternate approach to the large round baler is the large rectangular baler of the types shown in U.S. Pats. Nos. 3,552,109 and 4,118,918. To produce large rectangular bales by the conventional baler system, such as used for the smaller 16×18 inch bales, a machine must have a relatively heavy structure, and a power train capable of transmitting high torques due to the very high peak loads which occur for a small portion of each cycle when the plunger is completing its stroke. In addition, problems are encountered when tying off such a bale.

In addition to the various commercial types of balers referred to above, other prior art forms of balers have been suggested. One such type is shown in the Molitorisz U.S. Pat. No. 4,175,487. This form of baler utilizes cooperating belts and rollers which are oscillated across the inlet end of the bale chamber.

OBJECTS AND SUMMARY OF THE PRESENT INVENTION

In general it is an object of this invention to provide a novel method and apparatus for forming rectangular bales of varying cross sections, the method and apparatus being continuous in operation, even when bales are being discharged, and which forms bales of commercially acceptable density. In addition, it is an object of this invention to provide an apparatus which has relatively low power requirements, and particularly when used for making bales of large cross section, has a relatively low cost.

More specifically, it is an object of this invention to provide a baler having a bale chamber with an inlet end and feeding means associated with the inlet end of the bale chamber. A mat of material, conveyed towards the inlet end, is subsequently engaged by the feeding means which alternately feeds opposed surfaces of the mat towards the inlet, the fed mat of material being moved back and forth across the inlet end of the bale chamber to form successive layers of folded crop material within the bale chamber. The feeding means are also utilized to compact the material within the bale chamber. In addition, successive layers of folded crop material within the bale chamber are successively retained to prevent the crop material from springing out of the bale chamber. The feeding means includes spaced apart structures having saw tooth like elements capable of feeding the mat of material more aggressively when moved in one direction than when moved in the other direction, a portion of the saw tooth like elements engaging a layer of folded crop material within the inlet end of the bale chamber and having no relative movement with respect to the layers of crop material formed within the inlet end of the bale chamber.

In accordance with one embodiment of this invention the saw tooth like elements are secured to a pair of relatively closely spaced parallel rollers which are in turn carried by a common support. A mechanism is provided to move the rollers back and forth across the inlet end of the baler. In addition, drive means are provided which cause the rollers to rotate in a common first direction when they are moved in one direction across the inlet end of the bale chamber, and to rotate in the opposite direction when they are moved in another direction across the inlet end of the bale chamber. The drive means can be either a rack and pinions, or alternatively a chain and sprockets. The rotational speed of the rollers is such that the peripheral speed of the saw tooth like elements is substantially the same as the speed of movement of the rollers across the inlet end of the bale chamber whereby the saw tooth like elements will not tend to tear the folded layers of material within the bale chamber. Hay checks are provided at opposite sides of the inlet end of the bale chamber and successively retain the crop material within the bale chamber.

In another variation of this invention the saw tooth like elements are carried by adjacent opposed surfaces of upper and lower flights which pass over a pair of parallel roll structures. One end of each of the opposed flights is secured adjacent an associated side of the inlet end of the bale chamber. The other ends of the opposed flights are interconnected to each other by intermediate cable means which pass over intermediate idlers. The roll structures are reciprocated back and forth across the inlet end of the bale chamber, and this reciprocal movement causes the opposed surfaces to move in opposite directions. A mat of material is conveyed to the opposed surfaces and reciprocal movement of the surfaces will cause the mat to be fed into the inlet end of the bale chamber.

The foregoing structure will be described in greater detail with reference to the accompanying drawings in which a preferred form of this invention is illustrated.

BRIEF DESCRIPTION OF THE DRAWINGS

FIG. 1 is a side view of a baler in which the principles of the present invention may be incorporated, the baler being shown interconnected with a farm tractor or the like.

FIG. 2 is a perspective view illustrating one embodiment of this invention.

FIG. 8 shows an alternate drive for the pair of rollers.

FIG. 9 is a somewhat schematic side view representation of a a second embodiment of this invention.

FIG. 10 is a view taken generally along the line 10—10 in FIG. 9.

IN GENERAL

Figure 3:
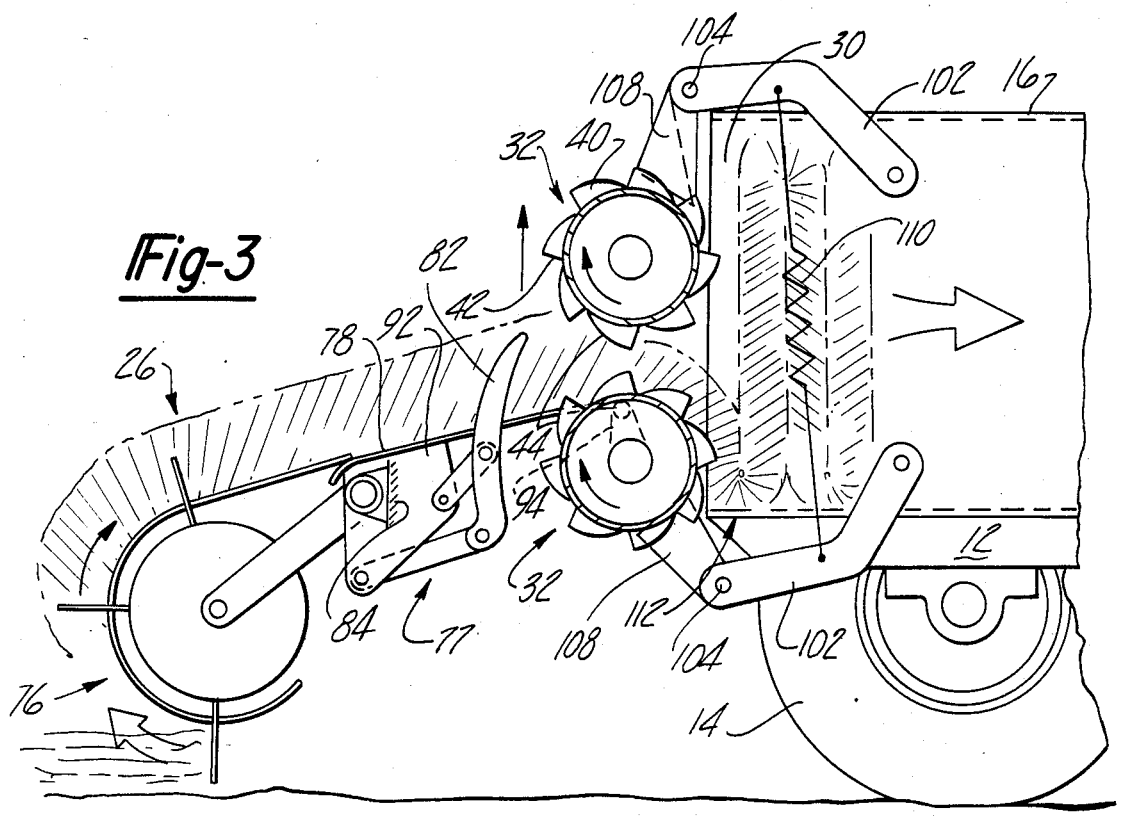
FIG. 3 is a side section of the baler shown in FIG. 2 illustrating the feeding rollers in an intermediate position.

Referring first to FIG. 1, the baler of this invention is indicated generally at 10. The baler includes a frame 12 to which are secured ground engaging wheels 14. Mounted above the frame 12 is a bale chamber 16. A knotter mechanism, indicated generally at 18, is mounted on top of the bale chamber. A forwardly extending tongue 20 is secured to the baler at a location spaced behind the knotter mechanism and extends forwardly, the forward end of the tongue being secured to the drawbar 22 of a tractor indicated generally at 24. Conveying means, indicated generally at 26 and feeding means, indicated generally at 28, are mounted forwardly of the bale chamber 16, the feeding means extending between the conveying means and the bale chamber.

DESCRIPTION OF THE EMBODIMENT SHOWN IN FIGS. 2-8

Figure 4:
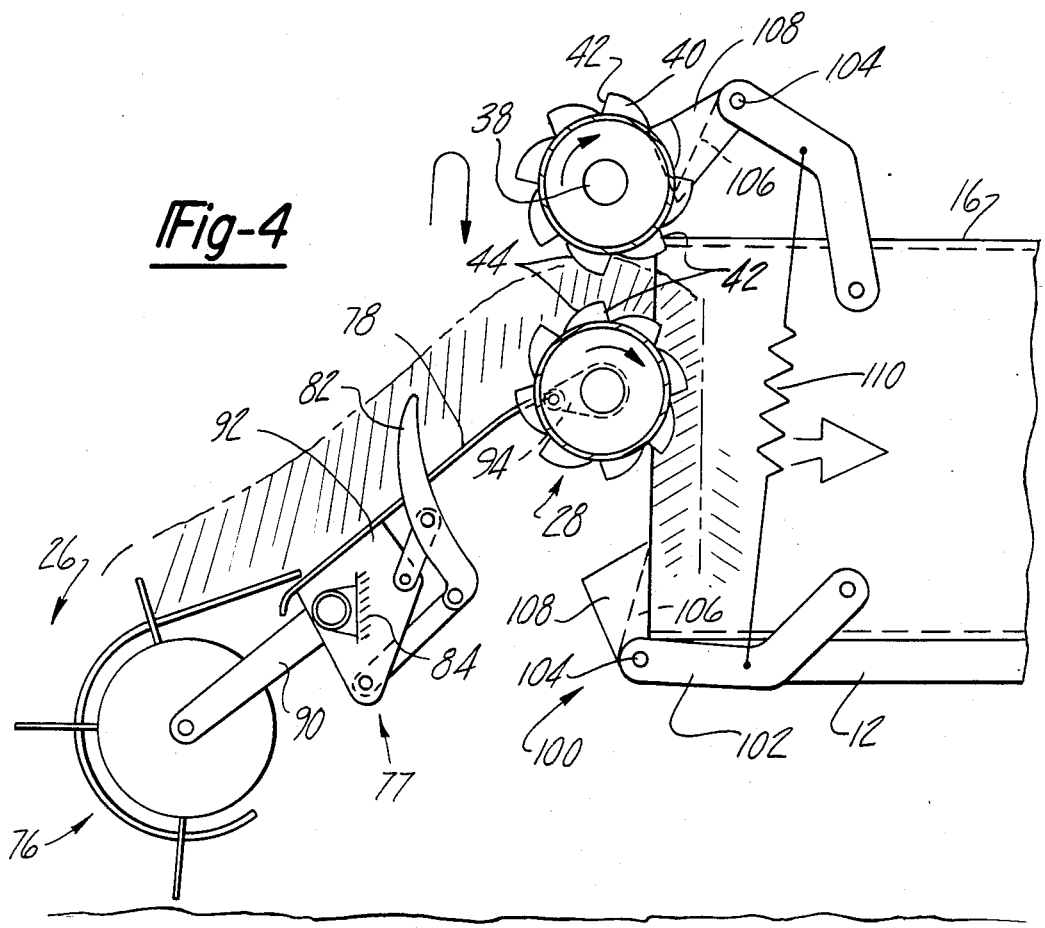
FIGS. 4 and 5 are views similar to FIG. 3 illustrating the feed rollers in upper and lower positions, respectively.
Figure 5:
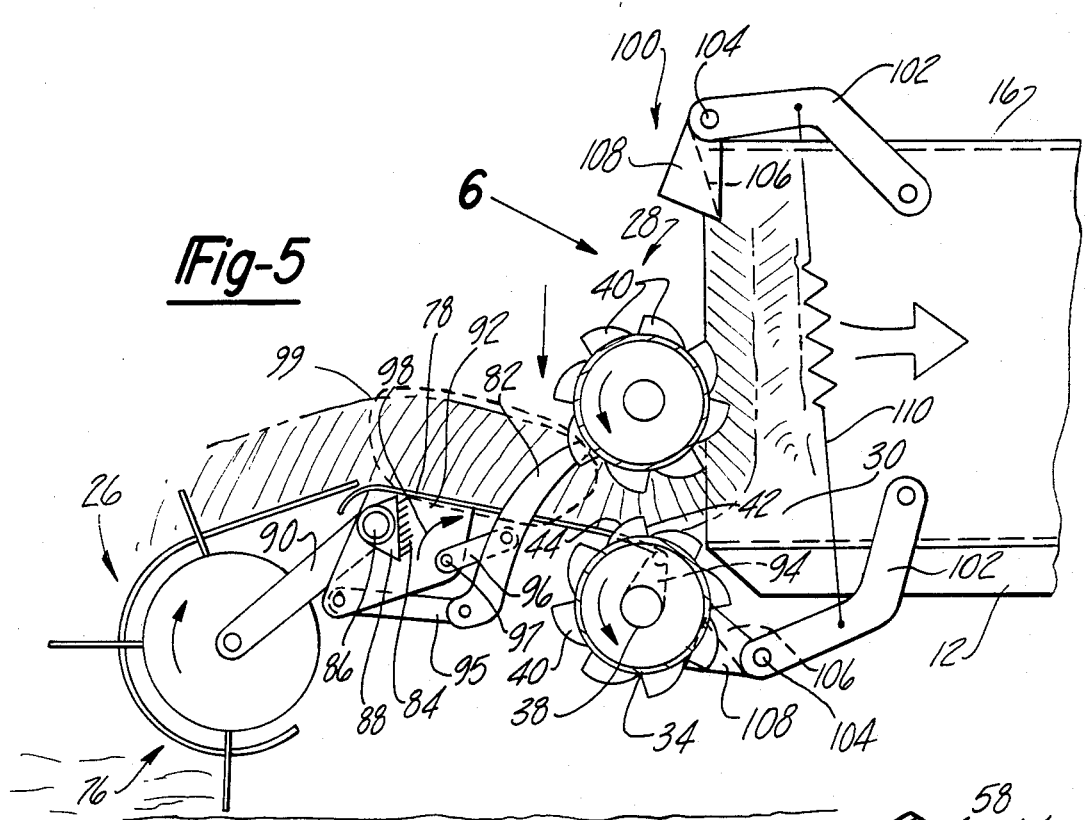

Reference will now be made to FIGS. 2-8 in which a first embodiment of this invention is illustrated. As can be seen from these figures the bale chamber has a forward inlet end 30, and a generally conventional tension rail mechanism 31. The feeding and compressing means 28 includes a pair of spaced apart adjacent parallel roll structures 32 disposed in front of the inlet end 30. Each of the roll structures 32 includes a cylindrical section 34, right and left end plates 36 (only the left end plate being shown in FIG. 7) and outwardly projecting right and left stub shafts 38. Mounted on the periphery of each tubular portion 34 are a plurality of saw tooth like feed elements 40. As illustrated in FIGS. 3-5, each of the saw tooth like elements has a sharply inclined leading surface 42 and a slightly inclined trailing surface 44. As can be seen from FIGS. 2 and 6 there are a plurality of axially spaced apart arrays of saw tooth like feed elements extending across the width of each of the rollers, the saw tooth like feed elements in each array lying in a common plane. The shafts 38 are coaxial with the cylindrical sections 34.

Figure 7:
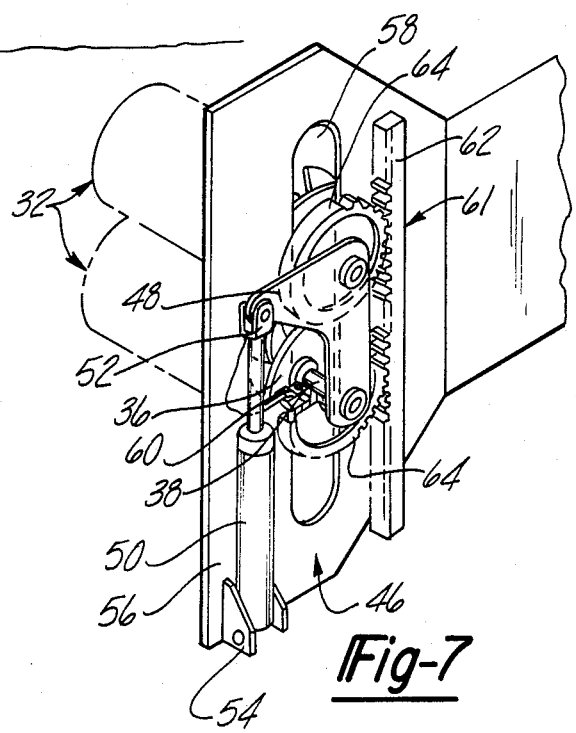
FIG. 7 illustrates one form of drive means for the pair of rollers shown in FIGS. 2 through 6, a common support for the pair of rollers, and a cylinder assembly capable of moving the common support back and forth.

Right and left hand moving means 46 are provided to move the roll structures 32 back and forth across the inlet end of the bale chamber, (only the left hand moving means 46 being shown in FIG. 7). In addition, right and left hand common supports 48 are provided in which the ends of the stub shafts 38 are journalled, the right hand stub shafts being journalled in a right hand common support (not shown) and the left hand stub shafts 38 being journalled in a left hand common support 48 (FIG. 7). Each of the moving means may be in the form of an extensible and rectractable hydraulic cylinder assembly 50, the rod end 52 being secured to a portion of the common support 48, and the anchor end being secured to a bracket 54 supported on forwardly extending sheet metal structure or frame 56 which is in turn interconnected with a side of the bale chamber 16. As can be seen from FIG. 2 the feeding means lies between right and left hand sheet metal structures 56. In order to ensure proper movement of the roll structures 32 each of the sheet metal structures 56 is provided with a vertically extending slot 58. Pulley like members 60 are journalled about the stub shafts 38, the pulley like members engaging the vertically extending side walls of the slots 58.

As the moving means 46 reciprocate the roll structures 32 back and forth across the inlet end 30 of the bale chamber 16 it is essential that the rotational speed of the rollers 32 be controlled. To this end drive means, indicated generally at 61, are provided. In FIG. 7 one form of drive means is illustrated, this form including a rack 62 and pinions 64 secured to the stub shafts 38 in any conventional manner. Thus, it can be seen as the cylinders 50 are extended both rolls 32 will rotate in a clockwise direction when viewed from the left hand side of the baler. Similarly, when the cylinders 50 are retracted, the pair of parallel rollers 32 will be caused to be rotated in a counterclockwise direction. Another form of drive means 61 is illustrated in FIG. 8. This form of drive means includes a chain 66, sprockets 68 secured to the ends of the stub shafts 38, and an idler sprocket 70 journalled for rotation on shaft 72 which is in turn secured to the common support 48. (While the common support 48 shown in FIG. 8 has a different configuration than that shown in FIG. 7, it forms the identical function of maintaining the spacing between the rolls 32 while in turn permitting their movement back and forth across the inlet end of the bale chamber when the cylinder assemblies 50 are extended or retracted). The ends of the chain 66 are secured by suitable fasteners 74 to the associated sheet metal structure 56. It can be seen that as the cylinder assemblies are extended the drive sprockets 68 will engage the chain 66 and cause the pair of rollers 32 to be rotated in a clockwise direction as viewed from the left hand side of the machine. Similarly, as the cylinder assemblies 50 are retracted counterclockwise rotation will be imparted to the rollers. The diameters of the pinions 64 and drive sprockets 68 are essentially the same as the working diameter of the rollers 32 so that the saw tooth like elements 40 will have no relative movement with respect to the mat of crop material being compacted into the baler. This will be discussed in greater detail in the discussion of the operation of the baler.

In the embodiment shown in FIGS. 2-8 the conveying means or delivery means includes a generally conventional crop pickup, indicated generally at 76. A structure 77, including a feed surface 78 extends between the crop pickup, and can be considered as part of the feeding means 28. As the baler 10 is propelled forwardly across a field, a mat of material will be picked up from the ground by the crop pickup 76 and will be delivered rearwardly across the feed surface 78. As can best be seen from FIG. 2, the feed surface 78 is provided with a plurality of slots 80 through which packer tines or fingers 82 extend. The crop pickup 76 is suitably interconnected with the frame 12 by a subframe 84, only a portion of which is illustrated in FIGS. 3–5. Thus, a transversely extending shaft 86 is journalled within brackets 88 which are in turn secured to the forward end of the subframe 84. The rear ends of downwardly and forwardly extending rock arms 90 are journalled about shaft 86, the forward end of the rock arms in turn supporting the pickup mechanism. The pickup mechanism 76 can follow ground contours as the rock arms 90 are free to pivot about the shaft 86. The platform 78 is in turn secured at its forward end to plate means 92 which are also journalled about the shaft 86. Rear side extensions of the feed surface 78 are in turn journalled to arms 94 which are in turn journalled on the stub shafts 38 for the lower roller 32, the arms being disposed between the end plates 36 and the pulley like members 60. As can be seen the rearward end of the feed surface 78 is maintained closely adjacent the upper peripheral surface of the lower roller 32 and because of its mounting arrangement this position will be maintained whether the rollers are in an upper position as illustrated in FIG. 4 or in a lower position as illustrated in FIG. 5. Each of the packer tines or forks 82 is in turn supported by a lower link 95 and an upper crank arm 96. Thus, each of the lower links 95 is pivotally secured at its rearward end to the lower end of a packer tine 82 and at its forward end to the plate means 92. Similarly, one end of each of the crank arms 96 is pivotally secured to a packer tine 82 ad the other end is secured to a rotatable shaft 97. The shaft 97 is rotated (in any conventional manner) in the direction indicated by arrow 98 which will cause the crank arms 96 to rotate in a clockwise direction when viewed from the left hand side of the machine. As each of the crank arms rotates it can be seen that the packer tines will convey material deposited upon the feed surface 78 in a rearward direction to force the material into the bit or nip of the parallel spaced apart rollers 32, the tips of the packer tines generally following the orbital path indicated at 99.

The operation of the embodiment illustrated in FIGS. 2–8 is as follows: During baling, as the hay baler is propelled forwardly over the surface of the ground by the farm tractor 24 or the like, the delivery means 26 will pick up a mat of fibrous crop material and deliver it in a rearward direction initially over the crop pickup 76 and then over the feed surface 78. During baling it should be appreciated that the crop pickup will be rotated in a clockwise direction as viewed from the left hand side of the machine, that the ends of the packer tines 82 will be moved in a clockwise orbital direction, and that simultaneously the rollers will be oscillated upwardly and downwardly across the inlet end of the bale chamber. In addition, it should be noted that as the pair of rollers are moved either up or down that simultaneous rotation will be imparted to the rollers. Thus, as the rollers are being moved upwardly, a clockwise direction of rotation will be imparted to the rollers, and similarly, as the rollers are being moved downwardly, a counterclockwise direction of rotation will be imparted to the rollers. It should thus be appreciated that adjacent surfaces of the rollers are moving in opposite directions. For example, when the rollers are being moved in an upwardly direction as indicated in FIG. 3, the adjacent surface of the lower roller is moving in a rearward direction towards the inlet end of the bale chamber, while the adjacent surface of the upper roller 32 is being moved away from the inlet end of the bale chamber. The saw tooth like elements carried by the rollers will feed more aggressively in one direction than the other. Thus, as the mat of fibrous crop material is conveyed rearwardly into the bite of the rollers, opposed surfaces of the mat are simultaneously engaged by the saw tooth like elements. The closely spaced apart adjacent feed surfaces will thus tend to feed the mat of crop material in a rearward direction. This is because the sharply inclined leading surface of each of the saw tooth like elements will more aggressively feed the mat of fibrous crop material than the slightly inclined trailing surfaces. Thus, even though the adjacent surface of the upper roller, when being moved in the upwardly direction, is moving away from the bale chamber, the mat of fibrous material will be more aggressively engaged by the lower adjacent surface and fed in a rearward direction. Similarly, when the movement of the rollers is reversed so that they are moving in a downward direction, a counter-clockwise direction of movement is imparted to the rollers, and the saw tooth like elements on the adjacent surface of the upper roll structure will more aggressively feed the crop material in a rearward direction than the saw tooth like elements on the adjacent surface of the lower roll structure. By moving the rollers back and forth across the inlet end of the bale chamber successive layers of folded crop material are formed within the bale chamber. During this action that roller which tends to feed the crop material into the bale chamber also tends to compress the material within the chamber. Thus, if the rollers are being moved in an upwardly direction as illustrated in FIG. 3, the lower roller will tend to feed the crop material into the bale chamber through the action of the saw tooth like elements adjacent the upper roller 32, and simultaneously, those saw tooth like elements adjacent the face of the layer of crop material being folded within the bale chamber will tend to compress said layer. As should be apparent from the above, the rollers 32 both feed and compress the mat of crop material into the bale chamber. As previously noted the peripheral speed of the rollers corresponds to the vertical speed of the rollers. Thus, the portion of saw tooth like elements adjacent the face of the bale being formed will have substantially no relative movement with respect to the face of the bale. Accordingly, the saw tooth like elements will not tear the face of the bale.

Figure 6:
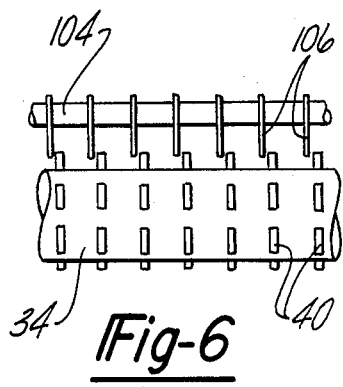
FIG. 6 is a view taken generally along the line 6 in FIG. 5 illustrating the relationship of the hay checks with respect to the saw tooth like elements on the feed rolls.

As can be seen from inspection of FIGS. 3, 4 and 5, as the rollers move back and forth across the inlet end of the bale chamber a portion of the fed crop material will not be confined by the rollers. Thus, when the rollers are in their upper position, as illustrated in FIG. 4, the lower surface of the successive layers which have been folded into the bale chamber are exposed. Similarly, when the rollers are in their lowermost position, as illustrated in FIG. 5, the upper surface is exposed. Therefore, it is essential that check means be provided to prevent fibrous crop material from springing out of the inlet end of the bale forming chamber as there is a certain amount of natural resiliency within the crop material. Thus, check means, indicated generally at 100, are provided for this purpose. In the embodiment illustrated upper and lower check means are provided. Each of the check means includes right and left hand pivoted members 102 which are interconnected with each other by a forwardly disposed transversely extending shaft or member 104. A plurality of retainer means 106 are mounted on each shaft 104, and in addition engaging members 108 are mounted in the outer ends of each shaft. The upper and lower check means are spring biased towards each other by a tension spring 110. The operation of the check means can be best appreciated from an inspection of FIGS. 4 and 5. Thus, when the rollers move to an upper position the cylindrical section 34 engages the upper engaging members 108 and continued upward movement of the pair of parallel rollers will cause the retaining means 106 to uncover the upper edge of the last folded layer of crop material. Thus, during this movement the spring 110 will be tensioned. As the rollers start moving downwardly the spring 110 will bring the upper check means back into its checking position illustrated in FIG. 5, and also in FIG. 6, and continued downward movement will cause the lower cylindrical section 34 to engage the lower engaging member 108 to cause the lower retaining means 106 to uncover the lower edge of the face of the bale being formed within the bale chamber. As can be seen from these figures the top of the bale chamber limits the inward movement of the check means 100. It has been found that it is desirable that the retainers 106 be spaced closely adjacent the saw tooth like elements 40 to insure that the checks will properly move into their retaining position. This relationship is illustrated in FIG. 6.

The bale after being formed is tied off in a manner not material to the present invention.

DESCRIPTION OF THE EMBODIMENT SHOWN IN FIGS. 9 AND 10

The embodiment shown in FIGS. 9 and 10 utilizes a somewhat different form of feeding and compressing means 28. Thus, the saw tooth like elements 40 are carried by chain means which in turn pass over rollers in the form of a plurality of spaced apart sprockets 114. While the sprockets 114 could be supported on transversely extending shafts, in the embodiment illustrated they are supported on the cylindrical section 34 of a roll structure 32 similar to the roller illustrated in FIGS. 2-8, the cylindrical section 34 being carried by stub shafts 38. The chain or conveying means, indicated generally at 116, thus includes opposed spaced apart upper and lower flights 118, 120, respectively, to which the saw tooth like elements are secured. The chain means also includes intermediate cable means 122. The ends of the opposed flights are secured to the sheet metal frame 56 by transversely extending support members 124. The opposed flights in addition to passing over the sprockets 114 on rollers 32, also pass over upper and lower forward idlers 126, 128, respectively. In addition, it should be noted, as can best be seen from FIG. 10, that each of the opposed flights is formed of a plurality of spaced apart conveyor chains 118, 120, the intermediate portions of the flights 118, 120 being supported by the pair of forward idlers 126, 128 and by adjacent portions of the pair of rollers 32. The intermediate cable is in turn journalled over upper and lower idlers illustrated by upper sheave 130 and lower sheave 132. The intermediate cable means 122 in order not to interfere with the fed mat of crop material, which is confined between the upper and lower conveyor flights 118, 120, is in fact disposed to one side of the flights. To this end, it is necessary to provide a transversely extending member 134 to which each of said spaced apart conveyor chains is secured, the intermediate cable means 122 being secured to the ends of the transversely extending member 134.

The operation of the embodiment shown in FIGS. 9 and 10 is essentially the same as that illustrated in the preceding figures. Thus, the stub shafts 38 are carried by common supports 48 which are reciprocated upwardly and downwardly by means of hydraulic cylinders 50 or the like. During their movement upwardly, the lower flight 120 will have effective rearward movement while the upper flight will have an effective forward movement. However, because the saw tooth like elements are more aggressive when being moved in the rearward direction towards the inlet end of the bale chamber, crop material confined between the feeding and compressing flights 118 and 120 will be conveyed in a rearward direction. Similarly, when the shafts 38, the rollers 32 and the sprockets 114 are moved in a downward direction, the upper flight will then have an effective rearward direction of movement while the lower flight will have an effective forward direction. Again, crop material confined between the flights will be conveyed in a rearward direction due to the effective one way action of the saw tooth like elements. As the material is being fed in, as for example by the action of the lower flights 120 as the rollers are moved in an upward direction, the material will be compacted against the face of the bale chamber by the right hand edge of the sprockets 114, the cylindrical section 34 and the saw tooth like elements 40 carried by the rollers. It should be noted that the cable means 122 is essential in order to ensure that take up movement of one flight, for example flight 120 when roller 114 is being moved upwardly, will cause payout movement of the upper flight 118. The idlers 126 and 130 should be spaced apart a distance at least equal to the stroke of the rollers to allow the member 134 to move freely. The upper position of the rollers 32 is shown in full lines in FIG. 9 while the lower position of the rollers is shown in broken lines.

In FIG. 9 the delivery means is illustrated by a crop pickup 76 pivoted to cross shaft 86 which is in turn carried by the frame of the baler. It is necessary to provide the feeding means of FIGS. 9 and 10 with a feed surface 138 consisting of two telescoping elements 140, 142, the first being pivoted to shaft 86 and the other to stub shafts 38. The feed surface 138 prevents crop material from falling to the ground. It is desirable that the idlers 126, 128 be equally spaced away from the centerline 144 of the bale chamber. It may also be desirable, particularly when forming bales of large cross section, to use the feed surface and packer tines 78, 82, illustrated in FIGS. 2-5.

In the embodiment shown in FIGS. 9 and 10 separate hay checks have not been illustrated. This is because the portions of the conveyor chains which lie against the face of the bale retain the material within the inlet end. Also, in this embodiment the chains 118, 120 cooperating with the sprockets 114 act as the drive means 61. In addition, a more aggressive form of saw tooth like element may be employed. Thus the saw tooth like elements 40 shown in FIGS. 9 and 10 are provided with a reversely inclined leaded surface 146 as well as with a slightly inclined trailing surface 148. This is because once the elements 40 engage the face of the bale being formed in the embodiment shown in FIGS. 9 and 10 there is no relative movement of the teeth with respect to the face of bale until the direction of movement of the rollers is reversed. Thus, the leading edge 146 cannot precede the trailing edge 148 when leaving the face of the bale being formed, as in the case of the embodiment shown in FIGS. 2-8.

While different forms of apparatus have been disclosed for practicing the principles of this invention, it should be noted that other forms of apparatus may be employed. Therefore, while preferred structures in which the principles of the present invention have been incorporated are shown and described above, it is to be understood that this invention is not to be limited to the particular details shown and described above, but that, in fact, widely differing means may be employed in the practice of the broader aspects of this invention.

What is claimed is:

1. A method of baling crop material comprising the following steps:
   providing a bale chamber having an inlet end and also providing spaced apart feeding means associated with the inlet end of the bale chamber each feeding means supporting an effective one way aggressive feed surface;
   conveying a mat of crop material in a rearward direction towards the bale chamber;
   simultaneously engaging opposed surfaces of the rearwardly conveyed mat of crop material with the one way aggressive feed surfaces and alternately feeding opposed surfaces of the mat of crop material in a rearward direction to a location adjacent the inlet end of the bale chamber;
   moving the feeding means and the fed mat of crop material back and forth across the inlet end of the bale chamber to form successive layers of folded crop material within the bale chamber; and
   utilizing the feeding means as it is moved back and forth across the face of the bale chamber to compact the layers of folded crop material within the bale chamber without tearing the successive layers of folded crop material.

2. The method of baling crop material as set forth in claim 2 wherein the successive layers of folded crop material within the bale chamber are successively retained to prevent the crop material from springing out of the bale chamber.

3. A crop baler (10) comprising:
   a bale chamber (16) having an inlet end (30);
   delivery means (26) disposed forwardly of the bale chamber (16) and capable of delivering a mat of crop material towards the bale chamber (16);
   feeding means (28) capable of simultaneously engaging opposed surfaces of the rearwardly delivered mat of crop material while alternately feeding opposed surfaces of the mat of crop material in a rearward direction to a location adjacent the inlet end (30) of the bale chamber (16), the feeding means (28) including a pair of rollers (32) each supporting an effective one-way aggressive feed surface (40);
   a common support (48) which supports said pair of rollers (32); and
   moving means (46) to move the feed mat of crop material back and forth across the inlet end (30) of the bale chamber (16) to form successive layers of folded crop material within the bale chamber (16), the moving means (46) engaging said common support.

4. The crop baler as set forth in claim 3 wherein the effective one way aggressive feed surface supported by each roller is a plurality of saw tooth like feed elements (40) which are secured to the periphery of each of the pair of rollers (32).

5. The crop baler as set forth in claim 3 wherein the feeding means (28) further include conveying means (116) having opposed flights (118,120), the effective one way aggressive feed surface being secured to the opposed flights (118,120).

6. The crop baler as set forth in claim 5 wherein the feeding means (28) further includes a pair of forward idlers (126, 128), intermediate portions of the flights (118, 120) being supported by the pair of forward idlers (126, 128) and by adjacent portions of the pair of rollers (32).

7. The crop baler as set forth in claim 6 wherein opposed ends of the conveying means are secured (by members 124) to opposite sides of the crop baler (10) adjacent the inlet end (30).

8. The crop baler as set forth in claim 7 wherein each of the opposed flights comprise a plurality of spaced apart conveyor chains (118, 120) the feeding means further including a pair of intermediate idlers (130, 132) and the conveying means further including intermediate cables (122) and transversely extending members (134) to which the forward ends of the opposed flights (118, 120) are secured, the intermediate cables (122) being secured to the transversely extending members (134) and supported by the pair of intermediate idlers (130, 132), the intermediate cables (122) passing to one side of the opposed flights (118, 120).

9. Apparatus for forming fibrous material into bales comprising:
   a bale chamber (16) having an inlet end (30);
   delivery means (26) capable of delivering a mat of fibrous material towards the inlet end (30) of the bale chamber (16);
   first and second spaced apart feeding and compressing means (28) extending between the delivery means (26) and the inlet end (30) of the bale chamber (16), each of the spaced apart feeding and compressing means (28) including an effective one way aggressive surface, the feeding and compressing means being capable of feeding and compressing the mat of fibrous material into the bale chamber (16) while being moved back and forth across the inlet end (30) of the bale chamber (16) to form successive layers of folded and compacted fibrous material within the bale chamber (16); and
   means (46) to move at least a portion of the spaced apart feeding and compressing means (28) back and forth across the inlet end (30) of the bale chamber (16), the first feeding and compressing means only feeding and compressing the mat of fibrous material into the inlet end of the base chamber when moved in a first direction and said secondary feeding and compressing means only feeding and compressing the mat of fibrous material into the inlet end of the bale chamber when moved in a second opposite said first direction.

10. The apparatus at set forth in claim 9 wherein the feeding and compression means are a pair of parallel roll structures (32).

11. The apparatus as set forth in claim 9 wherein the feeding and compressing means further includes a feed surface (78 or 138) and fingers (82).

12. The apparatus as set forth in claim 9 wherein the feeding and compressing means include a pair of parallel roll structures (32) which are reciprocated across the inlet end (30) of the bale chamber (16) and opposed upper and lower flights (118, 120), each of the flights (118, 120) being journalled over an associated roll structure (32), facing portions of said upper and lower flights including said effective one way aggressive surfaces.

13. Apparatus for forming fibrous material into bales comprising:
a bale chamber (16) having an inlet end (30);
delivery means (26) capable of delivering a mat of fibrous material towards the inlet end (30) of the bale chamber (16);
feeding means (28) disposed between the bale chamber (16) and the delivery means (26), the feeding means including first and second relatively closely spaced apart feed surfaces (34, 40 or 34, 40, 118, 120) capable of being moved in opposite directions relative to each other, each being provided with an aggressive surface (40) capable when moved in one direction to more aggressively feed crop material than when moved in the other direction, the feeding means when moved back and forth relative to each other being capable of receiving and confining the mat of fibrous material and feeding the fibrous material to the inlet end (30) of the bale chamber (16) to form successive layers of folded and compacted material within the bale chamber; and
means (46) to move the feed surfaces back and forth relative to each other.

14. Apparatus for forming fibrous material into bales comprising:
a bale chamber (16) having an inlet end (30);
delivery means (26) capable of delivering a mat of fibrous material towards the inlet end (30) of the bale chamber (16);
feeding means (28) extending between the delivery means (26) and the bale chamber (16), the feeding means (28) including spaced apart feed surfaces (34, 40 or 34, 40, 118, 120) capable of being moved back and forth relative to each other and between which the mat of fibrous material is confined, each of the surfaces more aggressively engaging and conveying the fibrous material when moved towards the bale chamber (16) than when moved away from the bale chamber; and
means (46) to successively move the feed surfaces back and forth relative to each other to cause the feeding means to form successive layers of folded and compacted fibrous material within the bale chamber.

15. The apparatus for forming fibrous material as set forth in claim 13 or claim 14 wherein each of the spaced apart feed surfaces is provided with a plurality of saw tooth like elements (40), each of the saw tooth like elements (40) having a sharply inclined leading surface (42) and a slightly inclined trailing surface (44), the leading surface facing the inlet end (30) of the bale chamber (16).

16. The apparatus for forming fibrous material into bales as set forth in claim 15 wherein the closely spaced apart feed surfaces are adjacent surfaces of a pair of cooperating rollers (32), said saw tooth like elements (40) being mounted on said rollers (32).

17. The apparatus for forming fibrous material into bales as set forth in claim 13 or claim 14 wherein said closely spaced apart feed surfaces are opposed upper and lower flights (118, 120), each flight including a plurality of spaced apart conveyor chains on which saw tooth like elements (40) are supported.

18. A crop baler comprising:
a bale chamber (16) having an inlet end (30);
delivery means (26) disposed forwardly of the bale chamber (16) and capable of delivering a mat of crop material towards the bale chamber (16);
feeding means (28) disposed immediately forwardly of the inlet end (30) of the bale chamber (16) and capable of feeding the mat of crop material into the inlet end (30) of the bale chamber (16) to cause successive layers of folded crop material to be formed within the inlet end (30) of the bale chamber (16), the feeding means (28) including a pair of rollers (32) capable of being moved back and forth across the inlet end (30) of the bale chamber (16), and one way aggressive feed elements (40) supported by the rollers (32), a portion of the feed elements engaging a layer of folded crop material within the inlet end (30) of the bale chamber (16);
moving means (46) capable of moving the pair of rollers (32) back and forth across the inlet end (30) of the bale chamber (16); and
drive means (61) capable of initially rotating the pair of rollers (32) in a common first direction as the rollers (32) are moved relative to the inlet end (30) to the bale chamber (16) in a first direction, and then rotating the pair of rollers in a common second direction as the rollers (32) are moved relative to the inlet end (30) to the bale chamber (16) in a second direction;
the feeding means, moving means, and drive means being so arranged and constructed that said portion of the feed elements have substantially no relative movement with respect to the layers of crop material formed within the inlet end (30) of the bale chamber (16) when the rollers are moved back and forth by said moving means.

19. The crop baler as set forth in claim 18 wherein the feed elements (40) are secured to said rollers (32), and further characterized by the provision of a common support (48) which supports said pair of rollers, said moving means (46) engaging said common support (48) and causing the common support (48) to reciprocate back and forth across the inlet end (30) of the bale chamber (16).

20. The crop baler as set forth in claim 18 wherein the feeding means further includes opposed upper and lower conveyor flights (118, 120), said feed elements (40) being supported by adjacent surfaces of the conveyor flights, and wherein one end (at 124) of each of the conveyor flights in secured relative to said bale chamber.

21. The crop baler as set forth in claim 20 in which the other ends of each of the upper and lower flights are interconnected to each other by intermediate cables (122), the other ends of upper and lower flights and the intermediate cables passing over forward idlers (126, 128) and intermediate idlers (130, 132).

22. Apparatus for forming fibrous material into bales comprising:
a bale chamber (16) having an inlet end (30);
delivery means (26) capable of delivering fibrous material towards the inlet end (30) of the bale chamber (16);

feeding means (28) disposed between the bale chamber (16) and the delivery means (26) and capable of feeding successive layers of the fibrous material to the inlet end (30) of the bale chamber (16), the feeding means (28) including first and second relatively closely spaced apart generally parallel feed rollers (32) cooperable with each other when rotated to feed fibrous material into the inlet end of the bale chamber, each of the rollers being provided with an aggressive surface (40) capable when rotated in one direction of more aggressively feeding crop material than when rotated in the other direction, the surfaces of the rollers being so arranged that the adjacent surface of the first roller is more aggressive than the adjacent surface of the second roller when both rollers are rotated in a common first direction of rotation, and the adjacent surface of the second roller is more aggressive than the adjacent surface of the first roller when both rollers are rotated in a common second direction of rotation opposite to said first direction of rotation; and drive means (61) to alternately rotate said pair of rollers in common first and second directions of rotation.

23. The apparatus for forming fibrous material into bales as set forth in claim 22 in which moving means (46) are provided to move the inlet end (30) of the bale chamber (16) and the first and second rollers (32) back and forth relative to each other.

24. The apparatus for forming fibrous material into bales as set forth in claim 23 wherein said first and second rollers (32) are interconnected by a common support (48) and the moving means (46) moves the common support (48) relative to the inlet end (30) of the bale chamber (16).

25. The apparatus for forming fibrous material into bales as set forth in claim 23 wherein the drive means (61) rotates the pair of rollers (32) in the common first direction as the rollers (32) are moved relative to the inlet end (30) of the bale chamber (16) in a first direction, and in the common second direction as the rollers (32) are moved relative to the inlet end (30) of the bale chamber (16) in a second direction.

26. The apparatus for forming fibrous material into bales set forth in claim 23 wherein the moving means (46) is a pair of extensible and retractable hydraulic cylinders (50) disposed on opposite sides of said first and second rollers (32).

27. The apparatus for forming fibrous material into bales as set forth in claim 22 wherein each of the first and second rollers (32) is provided with a plurality of saw tooth like elements (40) capable of engaging the fibrous material.

28. The apparatus for forming fibrous material into bales as set forth in claim 27 wherein the saw tooth like elements (40) on each of the rollers (32) are arranged in a plurality of circumferential arrays with axially extending gaps between the arrays of saw tooth like elements (40).

29. The apparatus for forming fibrous material into bales as set forth in either claim 22, 23 or 27 wherein the drive means (61) includes a rack (62) and pinion gears (64), there being one pinion gear (64) on one end of each of the rollers (32) in engagement with said rack (62).

30. The apparatus for forming fibrous material into bales as set forth in claim 24 wherein the drive means includes a chain (66) and sprockets (68, 70), the ends of the chain being fixed relative to the bale chamber (16), one of the sprockets being an idler sprocket (70) carried by the common support (48), and the other sprockets (68) being on one end of each of the rollers (32), all of the sprockets (68, 70) being in engagement with said chain (66).

31. The apparatus for forming fibrous material into bales as set forth in claim 22 wherein material check means (100) are provided between the feeding means (28) and the inlet end (30) of the bale chamber (16), the check means being capable of preventing fibrous material from springing out of the bale chamber.

32. Apparatus for forming fibrous material into bales comprising:

a bale chamber (16) having an inlet end (30);

delivery means (26) capable of delivering fibrous material towards the inlet end (30) of the bale chamber (16);

feeding means (28) disposed between the bale chamber (16) and the delivery means (26) and capable of feeding the fibrous material into the inlet end (30) of the bale chamber (16) to form successive layers of folded material within the bale chamber, the feeding means (28) including first and second relatively closely spaced apart generally parallel feed rollers (32) cooperable with each other when rotated to feed the fibrous material into the inlet end (30) of the bale chamber (16), each of the rollers (32) being provided with an aggressive surface formed of a plurality of saw tooth like elements (40), and being capable of more aggressively feeding crop material when rotated in one direction than when rotated in the other direction, the surfaces of the rollers being so arranged that the adjacent surface of the first roller is more aggressive than the adjacent surface of the second roller when both rollers are rotated in a common first direction of rotation, and the adjacent surface of the second roller is more aggressive than the adjacent surface of the first roller when both rollers are rotated in a common second direction of rotation opposite to said first direction of rotation;

moving means (46) to simultaneously move said rollers (32) back and forth across the inlet end of the bale chamber; and drive means (61) to rotate said pair of rollers (32) in a common first direction of rotation as said rollers are moved in a first direction and to rotate said pair of rollers in a common second direction of rotation as said rollers are moved in a second direction opposite to said first direction.

33. The apparatus for forming fibrous material into bales as set forth in claim 32 in which each of the first and second rollers (32) includes a cylindrical section (34) supported by outwardly extending coaxial shafts (38), the saw tooth like elements (40) being mounted on the cylindrical section (34).

34. The apparatus for forming fibrous material into bales as set forth in claim 32 wherein the saw tooth like elements (40) on each of said first and second rollers (32) are so arranged that there are a plurality of axially spaced apart arrays of saw tooth like elements extending across the width of the roller (32), each array lying in a plane normal to the axis of the associated roller.

35. The apparatus for forming fibrous material into bales as set forth in claim 34 wherein check means (100) are provided to prevent the fibrous material from springing out of the inlet end (30) of the bale chamber (16), the check means (100) being mounted adjacent the inlet end of the bale chamber.

36. The apparatus for forming fibrous material into bales as set forth in claim 35 in which the check means (100) includes a member (104) disposed along one side of the bale chamber, and a plurality of retainers (106) secured to the member (104), which retainers normally extend across a portion of the inlet end (30) of the bale chamber (16).

37. The apparatus for forming fibrous material into bales as set forth in claim 36 wherein the retainers (106) are disposable between and closely adjacent to spaced apart arrays of saw tooth like elements (40).

38. The apparatus for forming fibrous material into bales as set forth in claim 36 wherein said member (104) is swingably interconnected to the bale chamber, said member (104) and said retainers (106) being pivoted away from the inlet end (30) of the bale chamber (16) as the first and second rollers (32) complete their movement towards said member (104).

39. The apparatus for forming fibrous material into bales as set forth in claim 32 wherein the first and second feed rollers (32) are interconnected by a common support (48) and wherein the moving means (46) includes an extensible and retractable hydraulic cylinder assembly (50), one end of the cylinder assembly being interconnected with the bale chamber, and the other end being interconnected with the common support.

40. A crop baling machine comprising:
a frame (12, 56, 84) adapted to be propelled forwardly over a field;
a bale chamber (16) mounted on the frame and having a forward inlet end (30);
crop delivery means (26) carried forwardly of the frame (12, 56, 84) and capable of delivering crop material towards the inlet end (30) of the bale chamber (16);
feeding means (28) disposed between the bale chamber (16) and the delivery means (26) and capable of feeding a mat of crop material into the inlet end (30) of the bale chamber (16) to form successive layers of folded crop material within the bale chamber, the feeding means (28) including first and second relatively closely spaced apart generally parallel feed rollers (32) cooperable with each other when rotated to feed the mat of crop material into the inlet end (30) of the bale chamber (16), each of the rollers (32) being provided with an aggressive surface (40) capable when rotated in one direction of more aggressively feeding crop material than when rotated in the other direction, the sufaces of the rollers being so arranged that the pinch surfaces of the rollers will feed crop material rearwardly towards the bale chamber when the rollers are rotated;
a common support (48) which carries said rollers;
moving means (46) to move said rollers across the inlet end (30) of the bale chamber (16); and
drive means (61) to rotate said pair of rollers (32) in a common first direction of rotation as they are moved in a first direction, and to rotate said pair of rollers in a common second directon of rotation as they are moved in a direction opposite said first direction.

41. The crop baling machine set forth in claim 40 in which each of the first and second rollers (32) is provided with a plurality of axially spaced apart arrays of saw tooth like elements (40), each array of saw tooth like elements lying in a common plane normal to the axis of the roller (32).

42. The crop baling machine as set forth in claim 41 wherein material check means (100) are provided to prevent the crop material from springing out of the bale chamber (16), the material check means (100) including a plurality of retainers means (106), a portion of each retainers (106) passing between adjacent arrays of saw tooth like elements (32).

43. The crop baling machine as set forth in claim 40 in which the moving means (46) includes an extensible and retractable member (50) interconnected at one end with the frame (12, 56, 84) and at the other end with the common support (48).

44. The crop baling machine as set forth in claim 40 in which said drive means (61) to rotate said pair of rollers (32) is a rack (62) interconnected with the frame (12, 56, 84), and first and second pinions (64) nonrotatably secured to the first and second feed rollers (32).

45. The crop baling machine as set forth in claim 40 in which the first and second rollers (32) extend transversely across the front of the inlet end (30) of the bale chamber (16), and in which the delivery means (26) includes a crop pickup (76), the feeding means further including a feed surface (78), the forward end of the feed surface (78) being pivotally interconnected with the crop pickup (76), and the rearward end of the feed surface (78) being interconnected with the lower of the first and second rollers (32) and movable therewith.

46. The crop baling machine as set forth in claim 45 in which the feed surface (78) is provided with a plurality of longitudinally extending slots (80), and in which the feeding means (26) further includes fingers (82) extending through the slots (80) and movable in such a manner as to feed material received on the feed surface (78) in a rearward direction.

47. A baler comprising:
a frame (12, 56, 84) adapted to be propelled forwardly;
a longitudinally extending bale chamber (16) mounted on the frame (12, 56, 84), said bale chamber (16) having a forward inlet end (30);
crop delivery means (26) associated with the frame and located forwardly of the bale chamber;
a common support (48);
crop feeding means (28) disposed forwardly of the inlet end (30) of the bale chamber (16) and including a pair of cooperating upper and lower transversely extending feed rollers (32) carried by said common support (48);
drive means (61) to cause the feed rollers (32) to rotate; and
moving means (46) to move the common support (48) up and down across the inlet end (30) of the bale chamber (16);
the crop delivery means (26) including a crop pickup (76), the feeding means having a structure (77) provided with a surface (78) across which crop material is fed, a forward end portion (92) of the structure (77) being pivotally secured to the frame (12, 56, 84) and a rearward end portion (94) of the structure (77) being secured to the lower one of the pair of feed rollers.

48. The baler as set forth in claim 47 in which the crop feeding means (26) includes a plurality of fingers (82) supported by said structure (77).

49. The baler as set forth in claim 48 in which the feed surface (78) is provided with a plurality of longitudinally extending slots (80), said fingers (82) passing upwardly through said slots (80).

50. The baler as set forth in claim 49 in which the crop conveying means (26) further includes a rotatable shaft (97) carried by said structure (77, 92), crank arm (96) interconnected with said shaft (97) and said fingers, and linkage (95) pivotally interconnected at one end with said structure (77, 92) and at the other end with said fingers (82).

51. A baler comprising:
   a frame (12, 56, 84) adapted to be propelled forwardly;
   a longitudinally extending bale chamber (16) mounted on the frame, said bale chamber having a foward inlet end (30);
   a crop delivery means (26) mounted forwardly of the bale chamber;
   a common support (48);
   crop feeding means (28) disposed forwardly of the inlet end of the bale chamber and including a pair of cooperating upper and lower transversely extending rollers (32) interconnected with said common support (48);
   moving means (46) to move the common support up and down to cause the rollers to move up and down across the inlet end of the bale chamber; and
   upper and lower check means (100) capable of preventing compressed crop material from springing out of the bale chamber, the check means being disposed above and below the upper and lower rollers (32), each of the upper and lower material check means including a member (104) pivotally secured to the bale chamber (16), and retainers (106) carried by the member (104), at least a portion of the retainers (106) extending inwardly across a portion of the inlet end (30) of the bale chamber (16), the upper and lower material check means (100) being responsive to reciprocable movement of the rollers as they approach the limits of their movement to pivot away from the inlet end (30) of the bale chamber (16) to permit the cooperating rollers (32) to feed crop material fully across the face of the inlet end of the bale chamber.

52. The baler as set forth in claim 51 in which the member (104) is normally spring biased towards the inlet end (30) of the bale chamber (16).

53. The baler as set forth in claim 52 in which each of the upper and lower material check means (100) is provided with engaging means (108) extending between the member (104) and one of the rollers (32) and capable of being engaged by the associated roller (32) as the roller approaches its limit of movement to cause the material check means (100) to be moved against spring bias to cause a portion of the inlet end (30) normally covered by a portion of the material check means (100) to be exposed.

54. Apparatus for forming fibrous material into bales comprising:
   a bale chamber (16) having a forward inlet end (30);
   delivery means (26) capable of delivering fibrous material towards the inlet end (30) of the bale chamber (16), said delivery means including a crop pickup (76);
   feeding means (28) extending between the delivery means (26) and the bale chamber (16) and capable of feeding fibrous material received from said delivery means into the inlet end of the bale chamber to form successive layers of folded material within the bale chamber, the feeding means (28) including upper and lower relatively closely spaced apart generally parallel rollers (32), forward upper and lower idlers (126, 128), and conveying means (116) disposed over said rollers and said idlers, said conveying means including upper and lower spaced apart flights (118, 120) provided with saw tooth like elements (40), the ends of the conveying means being secured above and below the inlet end (30) of the bale chamber; and
   moving means (46) to simultaneously move said upper and lower rollers (32) back and forth across the inlet end of the bale chamber.

55. The apparatus for forming fibrous material into bales as set forth in claim 54 wherein the forward upper and lower idlers (126, 128) are fixed relative to said bale chamber (16).

56. The apparatus for forming fibrous material into bales as set forth in either claim 54 or 55 further characterized by the provision of a common support (48) which supports the upper and lower rollers (32), said moving means (46) including an extensible and retractable hydraulic cylinder assembly (50) secured at one end relative to said bale chamber and at the other end to said common support.

57. The apparatus for forming fibrous material into bales as set forth in claim 54 wherein said upper and lower flights (118, 120) include a plurality of spaced apart conveyor chains which are journalled over said rollers.

58. The apparatus for forming fibrous material into bales as set forth in claim 54 wherein said feeding means (28) further includes a telescoping feed surface (138) disposed below and closely adjacent the lower flight (120).

* * * * *

UNITED STATES PATENT AND TRADEMARK OFFICE
CERTIFICATE OF CORRECTION

PATENT NO. : 4,803,832

DATED : February 14, 1989

INVENTOR(S) : Alexander Crawford

It is certified that error appears in the above-identified patent and that said Letters Patent is hereby corrected as shown below:

Claim 2, line 2, change "2" to --1--.

Claim 9, line 28, following "second" insert --direction--.

Claim 20, line 6, change "in" to --is--.

Claim 42, line 5, delete "means".

Claim 3, line 1, delete blank line.

Signed and Sealed this

Seventh Day of November, 1989

*Attest:*

JEFFREY M. SAMUELS

*Attesting Officer*   *Acting Commissioner of Patents and Trademarks*